United States Patent [19]

Walters et al.

[11] Patent Number: 4,827,899
[45] Date of Patent: May 9, 1989

[54] ADJUSTABLE GAS TUBE ASSEMBLY

[75] Inventors: Jon S. Walters, Chesterfield, Mo.; Neil Boatwright, Newburgh, Ind.

[73] Assignee: American General Products, Inc., Maryland Heights, Mo.

[21] Appl. No.: 127,425

[22] Filed: Dec. 2, 1987

[51] Int. Cl.4 .............................................. F24C 3/04
[52] U.S. Cl. ................................ 126/41 R; 48/180.1; 431/354; 431/355
[58] Field of Search ................. 126/39 R, 39 B, 39 N, 126/39 K, 15 R, 15 A, 40 R, 40 A, 41 R, 25 R, 25 A; 48/180.1; 431/354, 355; 251/205, 121

[56] References Cited

U.S. PATENT DOCUMENTS

| | | | |
|---|---|---|---|
| 774,307 | 11/1904 | Butler | 48/180.1 |
| 1,572,833 | 2/1926 | Baker | 48/180.1 |
| 1,765,274 | 6/1930 | Hunter | 431/354 |
| 1,991,019 | 2/1935 | Kamp | 48/180.1 |
| 4,686,957 | 8/1987 | Koziol | 431/354 |

FOREIGN PATENT DOCUMENTS 28295 of 1884 Fed. Rep. of Germany ...... 431/355

Primary Examiner—James C. Yeung

[57] ABSTRACT

An adjustable gas tube assembly is disclosed for use with gas consumption means (including gas barbecue grills) and includes a gas delivery tube having a tubular air regulator member mounted therein at one end. The tubular air regulator member includes at least one elongated lateral opening which is selectively exposed, as desired, as the tubular air regulator member is inserted or withdrawn from the gas delivery tube. The tubular air regulator member is preferably provided with a restricted throat for gripping and retaining a gas supply tube section connected to a gas supply source. The tubular air regulator member is also preferably used with a flexible and expandable gas delivery tube.

5 Claims, 1 Drawing Sheet

ADJUSTABLE GAS TUBE ASSEMBLY

BACKGROUND OF THE INVENTION

This invention relates to an adjustable gas tube assembly for gas consumption means, such as a burner element in a gas barbecue grill. More specifically, it relates to an adjustable gas tube assembly in which a tubular air regulator member having an elongated opening is selectively positioned within a gas delivery tube to expose predetermined portions of the lateral opening, as may be desired.

Gas delivery tubes, including venturi tubes, which deliver gas to a burner element in a barbecue grill have valves or regulators to regulate the amount of air drawn into the gas delivery tube by the flow of gas therethrough. The venturi delivery system of U.S. Pat. No. 3,638,635 includes a complex valve arrangement including fittings and valves which are connected to the venturi tube, to admit a predetermined amount of air into the system as desired More modern construction such as shown in U.S. Pat. No. 4,488,534 include the now well-known rotatable air regulator which is adjustably mounted over a venturi tube and is rotated, as desired, to selectively open a predetermined portion of a lateral opening provided in the venturi tube. While the aforementioned designs have worked quite well, with the increasing need to remain world-wide cost competitive, they are more unduly complex and are more costly than is required.

Additionally, it has been discovered that helically ribbed copper tubing with a thick polymeric coating, such as shown in U.S. Pat. Nos. 3,472,131, and 3,472,132, may be used as a flexible and expandable gas delivery tube. While it was thought that heat might adversely effect such constructions in the contemplated environment of the present invention, they have been found to be exceedingly safe and work quite well in the intended environment. With such flexible and expandable tubing available as the gas delivery tube, new opportunities also then existed to completely re-design the air regulator system. While the tubular air regulator member of the present invention works well in connection with flexible and expandable tubing of the type described above, it also can be used with other flexible and non-flexible gas delivery tube systems as well.

SUMMARY OF THE INVENTION

Accordingly, it is among the objects and advantages of the present invention to provide a new and improved adjustable air regulator in a gas tube assembly.

Another object of the present invention is the provision of an adjustable air regulator in a gas tube assembly which is efficient in design and operation.

Still a further object of the present invention is the provision of an adjustable air regulator in a gas tube assembly which uses a minimum number of parts to achieve its desired result.

Other and further objects and advantages of the present invention include an adjustable air regulator in a gas tube assembly which is relatively simple and easy to manufacture, is quick and easy to assemble relative to other components, is durable in operation and use, can be used with flexible or rigid gas delivery tube systems as desired, and has a relatively long life, as compared with other prior art designs.

The foregoing objects and advantages are accomplished by an adjustable gas tube assembly in which a gas delivery tube is connected at one end to a gas consumption means and has an opposite free open end in which a tubular air regulator member is received. The tubular air regulator member includes at least one elongated lateral opening which extends in generally the same direction as the longitudinal axis of the tubular air regulator member and is slidably received within the free open end of the gas delivery tube in order to selectively determine the size of the lateral opening to be exposed beyond the free open end of the venturi delivery tube. Suitable fastening means are provided for securing the tubular air regulator member in its desired position relative to the gas delivery tube. The tubular air regulator member is also connected adjacent its exposed end section to a gas supply means. This latter connection is preferably achieved by employing a restricted throat in the tubular air regulator member for gripping a gas supply tube connected to a gas supply means. The tubular air regulator member is also preferably employed in a flexible and expandable gas delivery tube.

DESCRIPTION OF THE PREFERRED EMBODIMENTS

Figure 1:
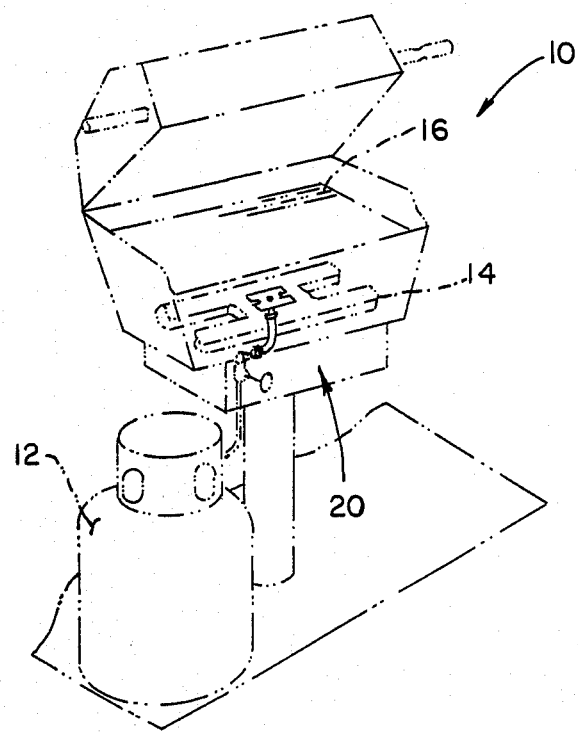
FIG. 1 is a perspective view illustrating the manner in which the adjustable gas tube assembly of the present invention is employed in a gas barbecue grill, which is itself shown in phantom lines as one typical embodiment in which the present invention is used.

Referring now to the drawings, it will be seen that a typical gas barbecue grill unit generally identified at 10 may include a gas propane tank 12 which supplies gas to a gas burner element 14. The gas burner element 14 disperses gas when lit to direct gas flames upwardly towards the grill 16 for barbecue cooking, as is well known. The gas barbecue grill unit 10 and its aforementioned component parts are shown in phantom lines in FIG. 1 of the drawings as the typical representative environment in which the adjustable gas tube assembly 20 is employed.

The adjustable gas tube assembly 20 preferably includes the helical ribbed copper tubing construction as disclosed in U.S. Pat. Nos. 3,472,131, and 3,472,132. Tubes of this type have an elongated helical coil over which there is molded a thick-walled polymeric tubing. The helically ribbed copper tubing 22 is both flexible and expandable so as to permit universal adjustment in the gas tube assembly during mounting to the gas barbecue unit 10 The copper tubing between the helical coils is also expandable upon delivery of gas through the tubing 22. The gas delivery tube 22 has opposite ends 24, 26, which are connected to the gas barbecue unit 10 and gas propane tank 12, as will now be described.

The upper end 24 of the gas delivery tube 22 is mounted to a mounting bracket 30 which, in turn, is mounted to the gas burner element 14, as can be seen in FIG. 1 of the drawing. The mounting bracket 30 includes a flange 32 having exposed slots 34 formed therein for receiving the threaded fasteners 36 to adjustably mount the flange 32 relative to the gas burner element 14 in varied and adjustable positions as may be required during assembly. A tubular extension 38 extends from the flange 32 and is complementary sized and shaped to be received within the upper end 24 of the gas delivery tube 22. A circumferential clamp in the form of a hose clamp 40 or the like may be employed to apply circumferential gripping pressure around the upper end 24 of the gas delivery tube 22 to grip and retain the tubular extension 38 of the mounting bracket 30. With the slots 34 and the flexible and expandable tubing 22, the application of the mounting bracket 30 and the gas delivery tube 22 to the gas burner element 14 will be facilitated.

As an important feature of the present invention, a tubular air regulator member 50 is mounted within the opposite free open end 26 of the gas delivery tube 22. Various fastening means may be employed to retain the tubular air regulator member 50 within the gas delivery tube including the use of a circumferential clamp 42 to apply circumferential gripping and retention pressure on the wall of the free open end 26 of the gas delivery tube 22. Or, the member 50 may be pressure fitted within the tube 22, and be tightly held therein during installation.

Figure 2:
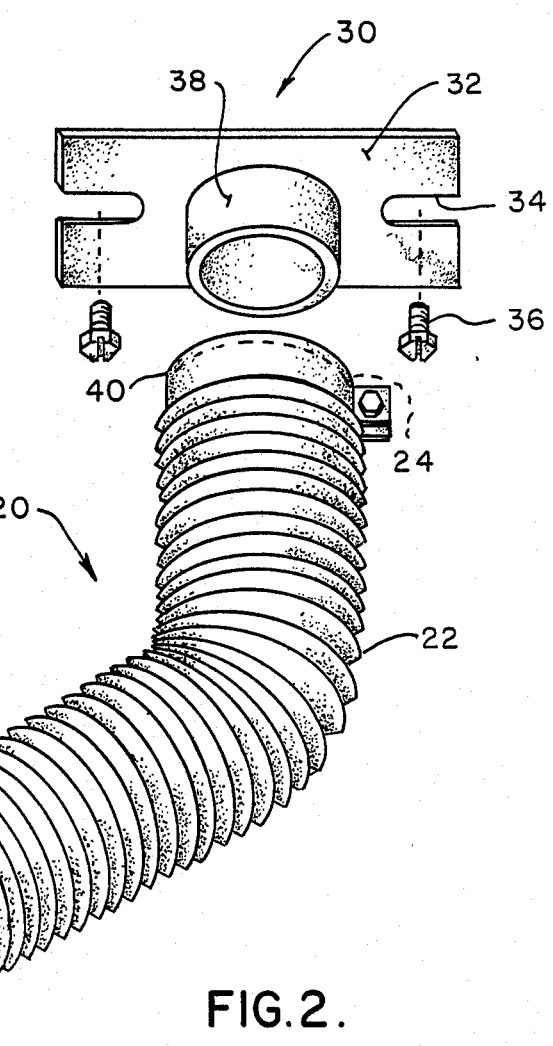
FIG. 2 is an exploded perspective view of the adjustable gas tube assembly which includes the inventive features as constructed in accordance with the teachings of the present invention.

The tubular air regulator member 50 is slidably received within the free open end 26 of the gas delivery tube 22 and includes an elongated lateral opening 52 formed in the tubular wall 54 thereof As shown by the oppositely pointed arrows in FIG. 2, the tubular air regulator member 50 is designed to be inserted and withdrawn, as desired, to selectively determine the size of the lateral opening to be exposed beyond the free open end 26 of the venturi delivery tube 22. The letter markings on the tubular wall 54 represent as follows: R for restricted air flow providing a rich gas-air mixture, M for medium air flow, and F for full air flow. Thus, the amount of air drawn in through the lateral opening 52, based on the venturi principle of gas flowing in the tubular air regulator member 50 and tube 22, may be varied to suit the particulars desired.

The tubular air regulator member 50 is open at one end 56 for free communication with the open end 26 of the gas delivery tube 22, but is preferably provided with an end wall 58 at the opposite end thereof. Which is exposed beyond the free open end 26 of the gas delivery tube 22. The end wall 58 may be formed as an integral part of the end wall 54 by a deformation/swaging process, or may comprise a separate locking retainer which has the outer edge secured by swaging, soldering, welding, or otherwise to the tubular wall 54. End wall 58 includes a restricted throat 60 for gripping a gas supply tube section shown only in phantom lines in FIG. 1 of the drawings. This gas tube supply section may be part of a valve or comprise an extended hose unit. In either case, the end wall 58 includes a plurality of circumferentially spaced radially inwardly directed flexible finger elements 62 which grip and retain a gas supply tube section therein. This is achieved by reason of the fact that the flexible fingers 62 will be somewhat deformed as a gas tube supply section is inserted therein, but will retain structural integrity with flexibility to grip and retain the gas supply tube section.

Figure 3:
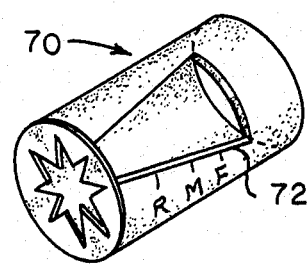
FIG. 3 is a perspective view of a modified form of tubular air regulator member which may be used in accordance with the teachings of the present invention.

A modified form of tubular air regulator member 70 is shown in FIG. 3 of the drawings. In this modified embodiment, the elongated lateral opening 72 becomes wider as it extends away from the end wall. Thus, the elongated lateral opening 72 has both transverse and longitudinal directional components relative to the longitudinal axis of the tubular air regulator member 70.

It will no doubt be appreciated that other changes and modifications may be made. For example, while the tubular air regulator member 50 is preferably employed with the flexible and expandable gas delivery tube 22 shown in the drawings and described in the aforementioned patents, it is contemplated that the tubular air regulator member 50 may be employed with other flexible and inflexible venturi delivery tube systems. As various other changes could be made in the above described constructions without departing from the scope of the invention, it is intended that all matter contained in the above description or shown in the accompanying drawings, shall be interpreted as illustrative and not in a limiting sense.

Having thus described the invention what is claimed and desired to be served by Letters Patent is:

1. An adjustable gas tube assembly for connection to a gas supply means including: a gas delivery tube connected at one end to a gas consumption means and having an opposite free open end, said gas delivery tube formed of helically ribbed means incorporating a polymeric tubing wall thereon, and being flexible for bending and expandable for lengthening during its installation within the adjustable gas tube assembly, a tubular air regulator member having at least one elongated lateral opening which extends in generally the same direction as the longitudinal axis of said tubular air regulator member, said tubular air regulator member being slidably received within the free open end of said gas delivery tube to selectively determine the size of the lateral opening of said regulator member to be exposed beyond the free open end of said gas delivery tube, fastening means for securing said tubular air regulator member in its desired position relative to said gas delivery tube, and said tubular air regulator member being connected adjacent to its exposed end section to the gas supply means, with said exposed end section of said tubular air regulator member including an end wall having a restricted throat for gripping of a gas supply means therein.

2. The assembly as defined in claim 1 wherein the elongated lateral opening also including a directional component which extend transversely to the longitudinal axis of said tubular air regulator member, with said elongated lateral opening being wider as it extends away from the end wall of the tubular air regulator member, whereby upon fastening of the gas delivery tube to the tubular air regulator member at a desired position relative to its lateral opening, the capacity for air entering through the lateral opening of the tubular air regulator member being adjustable in the gas tube assembly.

3. The assembly of claim 1 and wherein said gas delivery tube being heat resistant.

4. The assembly as defined in claim 1 wherein said fastening means comprises a circumferential clamp mounted on said gas delivery tube for circumferential gripping and retention of said tubular air regulator member.

5. The assembly as defined in claim 3 wherein said end wall includes a plurality of circumferentially spaced radially inwardly directed flexible finger elements for gripping and retaining a gas supply tube section therein.

* * * * *

UNITED STATES PATENT AND TRADEMARK OFFICE
CERTIFICATE OF CORRECTION

PATENT NO. : 4,827,899
DATED : May 9, 1989
INVENTOR(S) : Walters, Jon Scott, et al.

It is certified that error appears in the above—identified patent and that said Letters Patent is hereby corrected as shown below:

Claim 5, Column 4, line 64, change "3", to ---4---.

Signed and Sealed this

Sixth Day of February, 1990

*Attest:*

JEFFREY M. SAMUELS

*Attesting Officer*     *Acting Commissioner of Patents and Trademarks*